INVENTORS
IGNACIO ARANGUREN CASTIELLO
JAY E. OLNICK
OCTAVIO VASQUEZ SIERRA

INVENTORS
Ignacio Aranguren Castiello,
Jay E. Olnick,
Octavio Vásquez Sierra.

3,446,665
FIBER RECOVERY PROCESS
Ignacio Aranguren Castiello, Guadalajara, Jalisco, and Octavio Vasquez Sierra and Jay E. Olnick, Mexico City, Mexico, assignors to Union Starch & Refining Co., Inc., Columbus, Ind., a corporation of Indiana and Aranguren y Cia, S.A., Guadalajara, Jalisco, Mexico, a corporation of Mexico
Filed Apr. 22, 1965, Ser. No. 449,990
Int. Cl. C13l 1/00; B07b 1/20
U.S. Cl. 127—67         3 Claims

ABSTRACT OF THE DISCLOSURE

Fibers can be separated from agglomerates in which they are embedded, such as ground corn, by passing an equeous dispersion of the fiber-agglomerate through several stages of separation apparatus wherein in each stage the aqueous dispersion is forcibly propelled tangentially against on upwardly diverging frusto-conical screen whereby the liquid and particles of embedding material pass through the screen to form a filtrate and the fiber-containing residue moves upwardly along the screen for collection. The filtrate from a given separation stage can be recycled and used to form part of the aqueous dispersion input to a preceding separation stage.

---

This invention relates to a process for removing starch and similar material from fibers as in the manufacture of starch by wet milling, or for recovering fibers from fiber containing materials. More particularly, it relates to a continuous process which is capable of automation for recovering starch from wet milled, starch-fiber products.

Among the objects of the invention is to provide a starch recovery process having higher starch recovery with less washing stages than is required by conventional processes.

Among other objects of the invention is to provide a starch recovery process requiring very small floor space per unit of output.

Among other objects of the invention is to provide a continuous process for the recovery of starch which because of its no hold-up characteristics is ideally suited for automation. The no hold-up characteristics of the process also reduce fermentation problems to a minimum and provide a sanitary process free of toxic or irritating fumes.

A feature of the process is that the fiber removed is substantially free of starch and other pulverulent material so that the process is also useful in processes where a clean fiber is desired as in the paper industry. The process will be described in connection with the recovery of starch where starch is the primary product and fiber is a by-product; it will be understood however, that the process is useful in recovery processes where fibers are embedded in frangible agglomerated material.

The objects of the invention are attained by separating starch or similar pulverulent material from fiber in a plurality of stages by means of a device which, in the first instance, separates all of the fiber from most of the starch, and in the following steps, additional starch is separated from the fiber until a substantially starch-free fiber is obtained. In the process, the filtrate from the first washing process may be the only filtrate fed directly to the starch-protein separation system, starch from subsequent washings being eventually recovered by the counter-current feed of the wash water. This is a departure from conventional processes where all of the starch and a fraction of the fiber are separated in the first filtration, and additional portions of the fiber content are separated in subsequent washing steps.

The device for separating all of the fiber from most of the starch comprises a rotor adapted to impel the starch-fiber-water mixture against a frusto-conical diverging screen upwards at an angle of between 3 and 20 degrees to the vertical. The cone angle of the screen makes the starch-fiber-water mixture climb the screen surface. The finely divided materials and water pass through the screen, whereas the fiber, after being freed from a large part of water in its upward movement eventually falls inwardly and is conveyed over the top of the screen by a helical vane attached to the upper part of the rotor. The fiber leaves the device from a bottom cone outlet. The starch-containing filtrate leaves through a filtrate collector.

Other objects, features and many attendant advantages of this invention will be appreciated more readily as the same becomes better understood by reference to the following detailed description when considered in connection with the accompanying drawing wherein.

Figure 1:
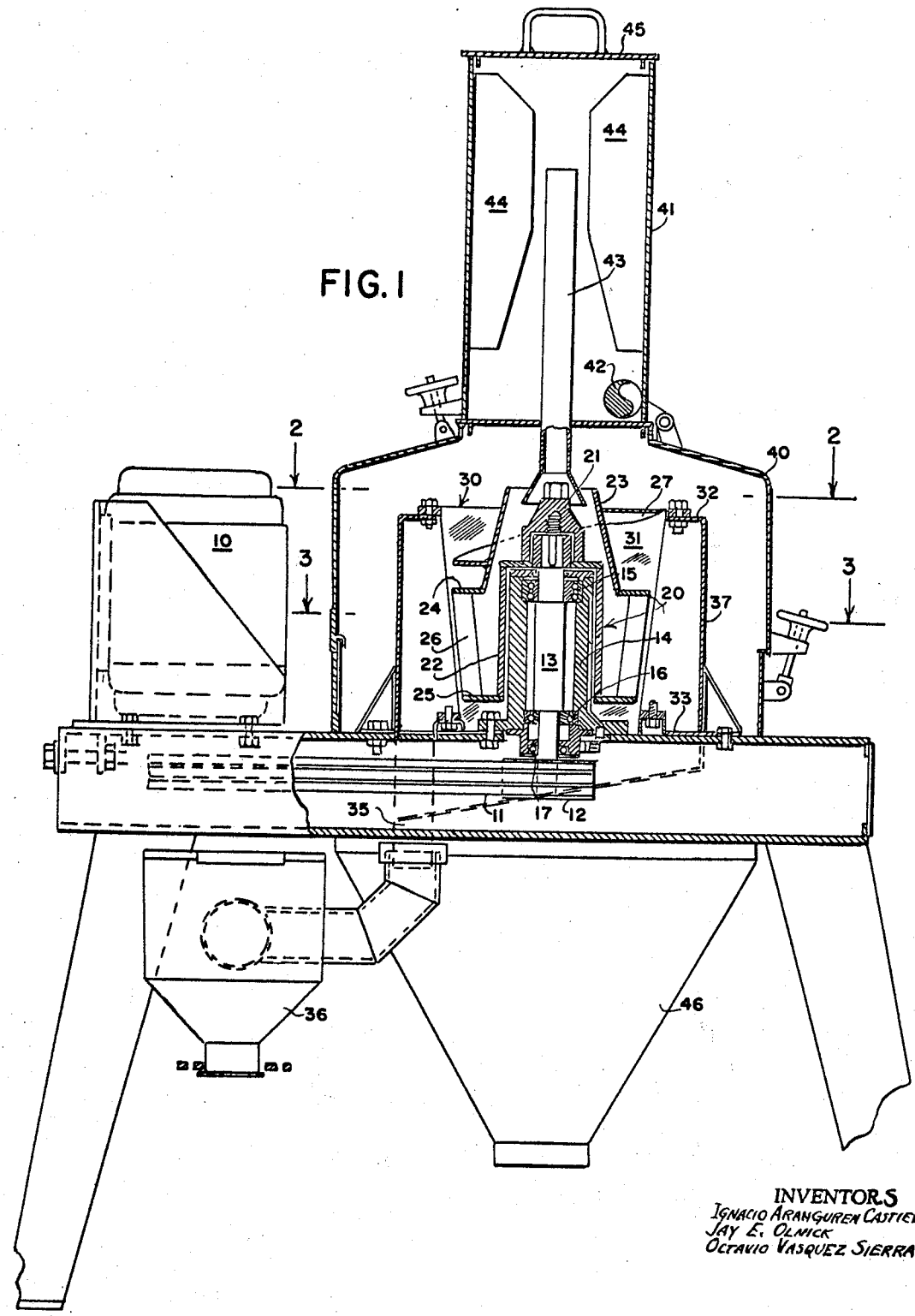
FIG. 1 is a side cross sectional view of the separator device employed in the process.
Figure 2:
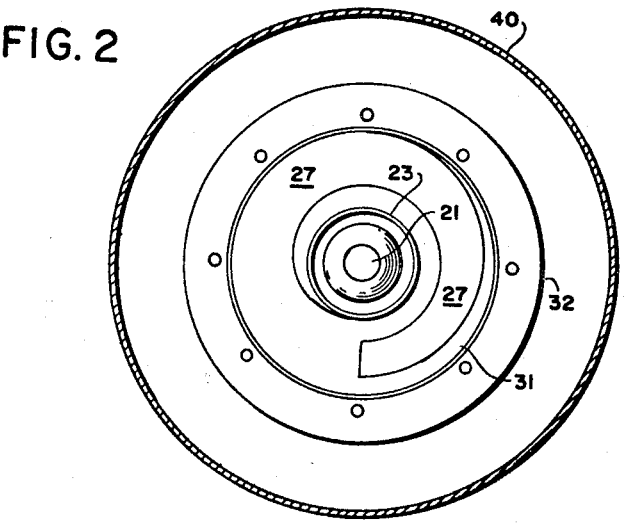
FIG. 2 is a horizontal cross sectional view taken on line 2—2 of FIG. 1.
Figure 3:
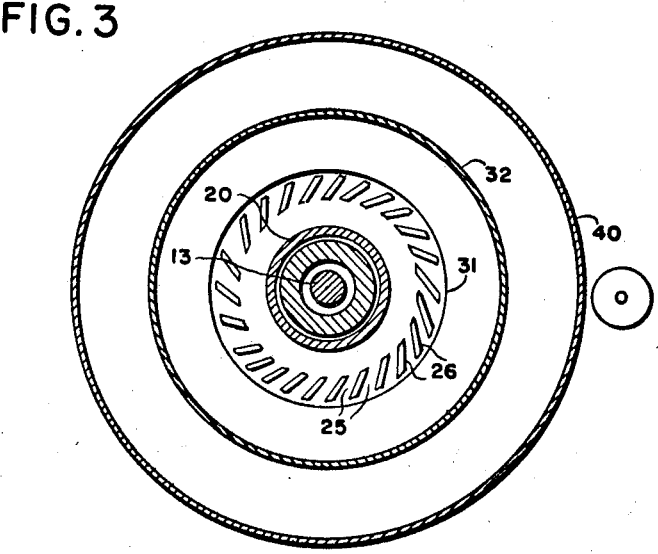
FIG. 3 is a horizontal cross sectional view taken on line 3—3 of FIG. 1.

The rotor 20 of the device 9 is driven by motor 10 through belt drive 11, pulley 12, and shaft 13. Shaft 13 is mounted for rotation within tube 14 by suitable bearings 15 and 16. A seal 17 is also provided at the lower end of shaft 13.

The rotor 20 comprises the upper hub and guide portion 21, the inner tubular wall portion 22, the upper, upwardly converging frusto-conical tube 23, upper wall 24 and bottom wall 25 formed as flanges on tube 23 and wall 22, and a helical vane conveyor 27 mounted above wall 24 outside tube 23 and serving to transport the fibers from near the top of the screen 31 to the region above the top of the latter. An array of circumferentially spaced vanes 26 extend vertically between walls 24 and 25.

The filter means 30 comprises the tubular screen 31 which has the shape of an upwardly diverging frusto-conical tube extending well beyond vanes 26. The screen 31 for example may be formed from wedge wire slit screen material having openings of about 50 microns in diameter. Such a screen will effect removal of particles as small as 25 microns in the process of the invention. The angle of divergence of the screen is similar to or follows the angle made by the outside edges of vanes 26. The screen 31 is held between the flanges 32 and 33 of a tubular casing 37 which encloses the screen. Liquid passing through screen 31 is collected in pipe 35 and conveyed to collector 36. Fibers passing over the top of filter 30 are collected in funnel 46.

The filter 30 is surrounded by casing 40 on top of which is positioned the feed tank 41. Liquid to be filtered to remove fiber is fed to the tanke 41 through the pipe 42 at the lower end thereof and, leaves the tank 41 through the pipe 43 after passing upwardly to overflow into pipe 43. The tank 41 thus provides a trap for the separation of heavy particles which remain in the lower part of the tank. A lid 45 is provided for tank 41.

In operation, a fiber slurry which may be a starch-fiber-water slurry or merely a dirty fiber slurry is fed to tank 41 through inlet pipe 42. The rotor 20 is started and rotated at about 1000 to 2000 r.p.m. As the slurry fed to tank 41 reaches the top of pipe 43 it is passed over hub 21 of rotor 20 and down through the central aperture where wall 24 joins tube 23. Walls 22, 24 and 25 are impervious and centrifugal force impels the liquid outwardly and the vanes 26 expel the liquid in a tangential direction. When the liquid strikes the stationary screen in a tangential direction, its path of least resistance is then slightly upwardly rather than downwardly due to the frustoconical angle of the screen. As the liquid passes upwardly, the liquid and finer particles thereof pass through the screen and are collected through tube 35 in tank 36 whereas the larger particles, i.e. fibers, continue to move upwardly until the helical vane 27 contacts said fibers and more positively moves upwardly and over the top of the filter 30.

This device takes advantage of the principle of filtration that the efficiency of a filtration surface can be increased by passing more material to be filtered over its surface. The capacity of the filtration surface of the device shown for filtering starch slurrys as compared to shakers 37:1. That is, the present apparatus with a filtration surface of 2700 sq. cm. takes the place of 5 shakers of 2 sq. meters each, or a total of 100,000 sq. cm. of filter surface. The space required for the installation of the present invention is obviously much less than that required for 5 shakers.

The angle of divergence from the vertical of the sides of the filter and the outer edges of the vanes 26 is a critical value and as stated above should be between 3° and 20°. If the angle is over 20°, the material moves upwardly too fast. The rate of feed of the liquid to tank 41 and thus through pipe 43 is regulated so that the level of liquid in the tank 41 does not rise appreciably above the top of pipe 43.

The path of the fiber

Figure 4:
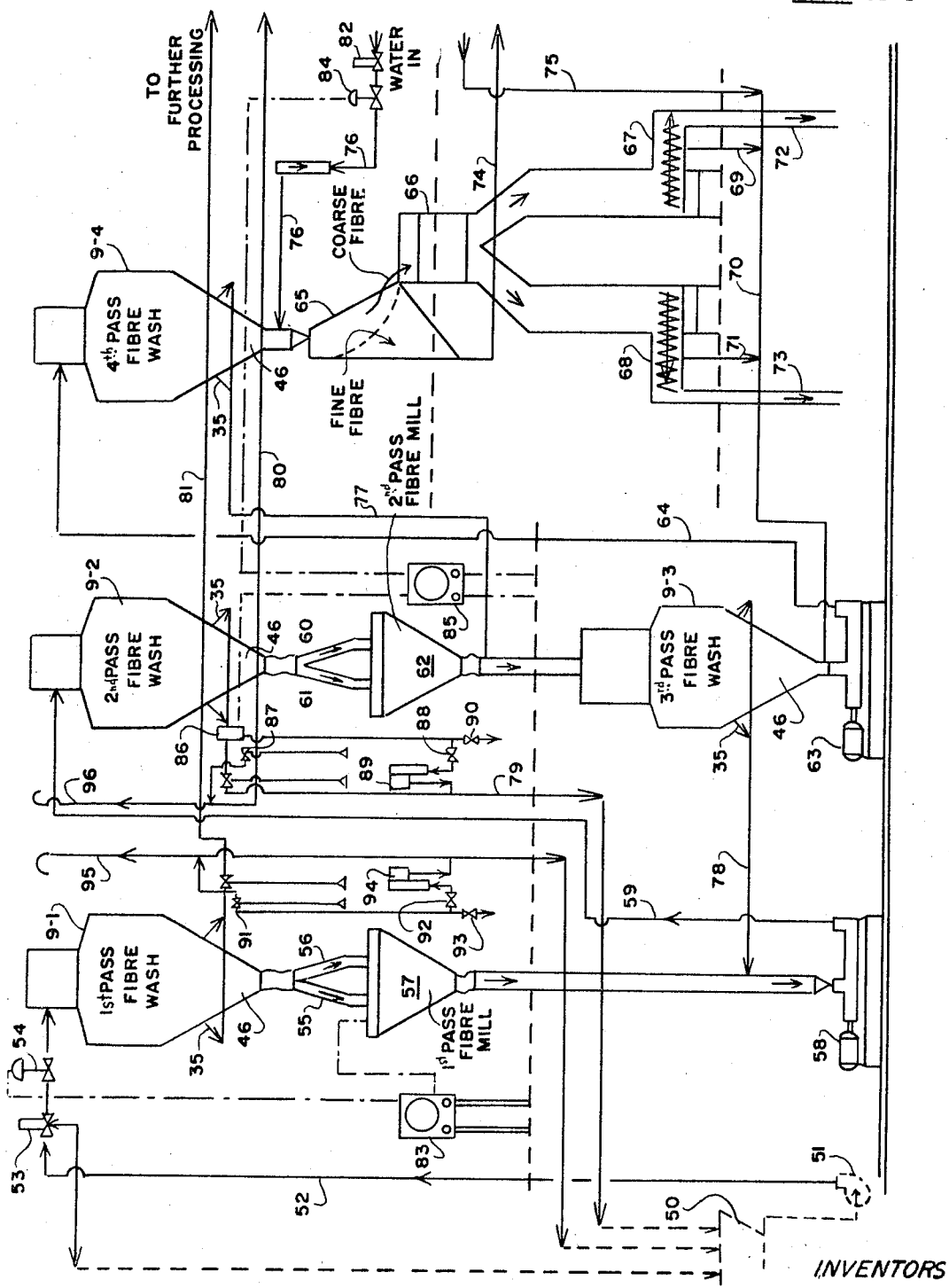
FIG. 4 is a view partly diagrammatic, of the combination of apparatus used to carry out the process.

Rather than explain each detail of the process (as illustrated in FIG. 4) simultaneously, the process will be described with respect to the path of the fiber, the path of the water, the path of the starch and the controls.

The starch slurry from the germ separation device 50 is pumped by pump 51 through line 52 to the first-pass fiber wash device 9–1 (the device 9–1 corresponding to the device of FIG. 1). The fiber fraction collected by cone 46 is fed by pipes 55, 56 to a first-pass fiber mill 57 wherein it is further ground and fed by pump means 58, through line 59 to the second-pass fiber wash device 9–2. The fiber fraction from device 9–2 is fed from the cone collector 46 thereof through pipes 60–61 to a second-pass fiber mill 62. The reground mix from mill 62 passes by gravity directly to the third-pass fiber wash devices 9–3. The fiber fraction from cone collector 46 of device 9–3 is fed by pump means 63 and line 64 to the fourth-pass fiber wash device 9–4. The fiber fraction from cone collector 46 of device 9–4 is dropped by gravity against a sloping screen, the fine fibers passing through screen 65 and the coarser fibers passing to hopper 66. The coarse fibers pass to one of the screw type moisture expellers 67 or 68. Water squeezed from the fiber in expellers 67 or 68 passes to line 70 through connections 69 or 71 respectively. The fiber is fed through conduits 72 or 73 and may then be dried preparatory for use as cattle feed, etc. The fine fiber passing through screen 65 is separately dehydrated after passing through line 74 as by conventional centrifugal devices. Excess water from the processing of the fine fibers is returned to the system through lines 75 and 70 and thence to the cone 46 of fiber wash device 9–3.

Path of the water

Water which may be fresh water or water from a later step in the process (the starch-protein separation step, for example) is fed into the system through pipe 76 to the fiber-collecting cone of the last or fourth-pass fiber wash device 9–4. This water passes with the fibers to moisture expellers 67 and/or 68 and to the similar fine fiber water expellers. Water from the expellers is returned to cone 46 of wash device 9–3 and provides the liquidity necessary to provide the slurry which is pumped by pump 63 to the fourth-pass fiber wash device 9–4. Most of the water of the slurry entering wash device 9–4 passes through the screen 31 (not shown in FIG. 4) of device 9–4 and through the pipe 35 thereof. This water, containing the starch recovered in the fourth-pass fiber wash device 9–4, is fed to the discharge end of fiber mill 62 through pipe 77 and provides additional liquidity to the slurry entering the third-pass fiber wash device 9–3. The water or aqueous portion of the slurry entering the third-pass fiber wash device 9–3 passes out of said device 9–3 through its pipe 35 to line 78 and is fed to the discharge end of mill 57 to provide additional liquidity to the slurry entering the second pass fiber wash device 9–2.

From the filtrate discharge means 35 of the second fiber wash device 9–2, the path of the water fraction or filtrate is somewhat optional. Thus, the same countercurrent principle can be adopted and said filtrate can be directed through pipe 79 to the germ separator means 50. On the other hand, the liquid fraction from device 9–2 is already quite loaded with starch since considerable additional starch is freed by the fiber mill 57 so that optionally, the liquid fraction from device 9–2 can be fed directly to the next processing step, for example the protein-starch separation step through pipe 80.

Path of the starch liquors

Pipes 80 and 81 carry starch liquors from device 9–2 and/or 9–1 to the subsequent processing devices.

Controls

The control circuits are not a part of the invention, per se, but serve to illustrate the adaptability of the process for automatic control.

The valves 53 of line 52 and 82 of line 76 are solenoid controlled valves which cut off in the event of an electrical failure.

The valve 54 of line 52 is automatically controlled by the recorder controller device 83 which controls the valve 54 in accordance with the ampere load on the motor (not shown) of the fiber mill 57.

The valve 84 controlling the amount of water admitted to the system is controlled through recorder controller 85 in accordance with the density of the filtrate from the second-pass fiber wash device 9–2 as measured by the density measuring device 86.

Valves 87 and 88 provide for gravity flow of the filtrate from device 9–2 to the gravity cup 89 so that a workman can check the liquor from time to time. Valve 90 provides for purging the line. Similar valves 91, 92 and 93 are provided to check the filtrate from device 9–1 in gravity cup 94.

Pipes 95 and 96, open at the top, provide escape routes for the liquors if the lines become clogged.

Figure 5:
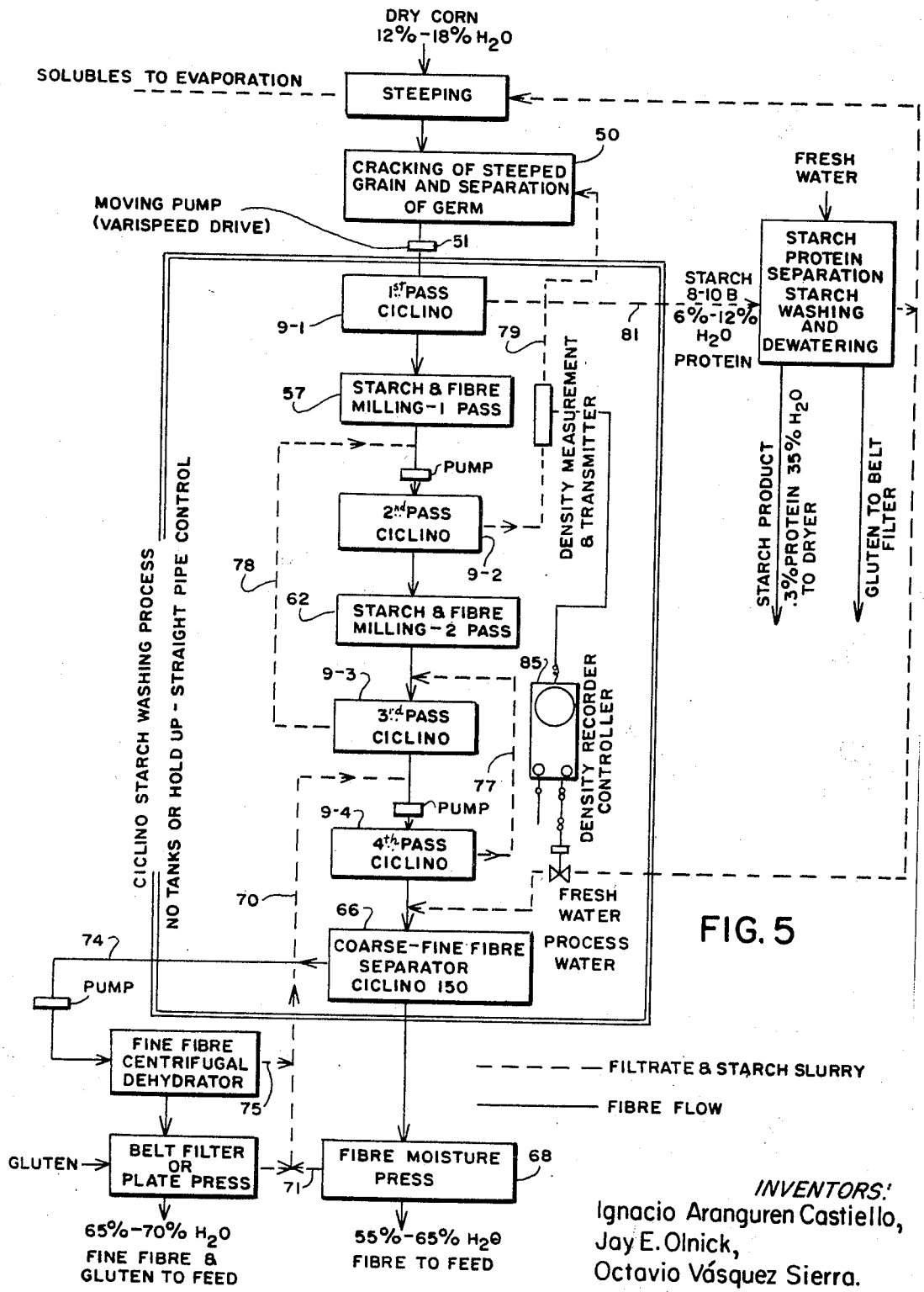
FIG. 5 is a flow sheet illustrating the process steps.

A simplified version of the process as applied to corn starch is illustrated in the flow sheet of FIG. 5 wherein the numbering of the boxes, etc., is similar to that used in FIG. 4.

It is thus seen that the process operates continuously without hold-up or storage of the liquors at any stage thereof. The first-pass fiber wash device 9–1 is capable of separating a fiber product of almost constant moisture content under widely varying feed rates. Consequently, a slight lag in the operation of valve 54 whether controlled automatically or manually does not deleteriously affect the operation of the process. The regulation of the water entering the system through valve 84 primarily affects the efficiency of operation so that automatic controls tend to provide operation at the greatest efficiency whereas some deficiency with manual control of this valve would not result in failure of the process but only in reduced efficiency. The process employs four filter stages, whereas at least five filter stages are required to obtain the same yields by conventional processes. The process is also sanitary due to the elemination of stored or quiescent liquids. The apparatus for the process can be enclosed in a very small space without requiring any unusual ventilation means.

We claim:

1. A process for separating fibers from agglomerate material in which they are embedded comprising providing an aqueous dispersion of the coarsely ground material, forcibly propelling said dispersion tangentially through vanes against a surrounding stationary screen having an upwardly diverging frustoconical shape with the angle of divergence from the vertical of the sides of the screen between 3° and 20°, the openings of said screen being of a size adapted to admit particles of the embedding material whereby said aqueous liquid and particles of embedding material pass through said screen as a first filtrate and the fiber-containing residue moves upwardly within said frustoconical screen, removing fiber-containing residue from the upper interior portion of the screen by means of a helical conveyor, further grinding the removed fiber-containing residue, adding aqueous liquid to said reground fiber-containing residue to form a dispersion, forcibly propelling said resulting dispersion of reground fiber-containing residue tangentially through vanes against a surrounding stationary screen having an upwardly diverging frustoconical shape with the angle of divergence from the vertical of the sides of the screen between 3° and 20°, the openings in said screen being of a size adapted to admit particles of the embedding material whereby said aqueous liquid and particles of embedding material pass through said screen as a second filtrate and the remaining fiber-containing residue moves upwardly within said frustoconical screen, removing the fiber-containing residue from the upper interior portion of the screen by means of a helical conveyor, adding aqueous liquid to the fiber-containing residue and subjecting it to a third and fourth similar fiber separation step, the filtrate from the fourth separation step being transmitted counter-currently to become the liquid added to the fiber-containing residue for the third separation step, and the filtrate from the third separation step being transmited counter-currently to become the liquid added to the residue for the second separation step whereby the filtrate obtained from the first and second separation steps contain substantially all of the separated embedding material particles.

2. The process as claimed in claim 1 wherein the agglomerate material containing embedded fibers is degermed starch material.

3. The process as claimed in claim 1 comprising feeding the second filtrate counter-currently to become the liquid added to the dispersion subjected to the first separation step whereby said first filtrate contains substantially all of the embedding material recovered in said several steps.

References Cited

UNITED STATES PATENTS

| | | | |
|---|---|---|---|
| 302,077 | 7/1884 | Wilson | 209—306 |
| 341,283 | 5/1886 | Schuman | 127—67 |
| 788,219 | 4/1905 | Ogle | 209—306 |
| 1,331,587 | 2/1920 | Shevlin | 207—273 |
| 1,663,731 | 5/1926 | Redlich | 127—56 X |
| 2,310,651 | 4/1938 | Peltzer et al. | 127—68 |
| 3,029,169 | 4/1962 | Dowie et al. | 127—67 |

OTHER REFERENCES

John H. Perry, "Chemical Engineers' Handbook," 19–96, McGraw-Hill, New York, 1963.

George D. Dickey, "Filtration," p. 121, Reinhold Publishing Corp., New York, 1961.

MORRIS O. WOLK, *Primary Examiner.*

SIDNEY MARANTZ, *Assistant Examiner.*

U.S. Cl. X.R.

127—23, 24, 25; 209—273, 306; 210—415